United States Patent [19]
Stiffler

[11] Patent Number: 5,787,243
[45] Date of Patent: Jul. 28, 1998

[54] MAIN MEMORY SYSTEM AND CHECKPOINTING PROTOCOL FOR FAULT-TOLERANT COMPUTER SYSTEM

[75] Inventor: Jack J. Stiffler, Hopkinton, Mass.

[73] Assignee: Texas Micro, Inc., Houston, Tex.

[21] Appl. No.: 674,660

[22] Filed: Jul. 2, 1996

Related U.S. Application Data

[63] Continuation of Ser. No. 258,165, Jun. 10, 1994, abandoned.

[51] Int. Cl.$^6$ .................................................... G06F 11/00
[52] U.S. Cl. ..................... 395/182.11; 395/182.04; 395/569; 711/135
[58] Field of Search ................. 395/182.03, 182.04, 395/182.05, 462, 468, 488, 489, 182.11, 182.1, 182.13, 182.14, 182.15, 182.18, 569; 711/162, 161, 135

[56] References Cited

U.S. PATENT DOCUMENTS

| | | | |
|---|---|---|---|
| 3,588,829 | 6/1971 | Boland | 340/172.5 |
| 3,736,566 | 5/1973 | Anderson et al. | 340/172.5 |
| 3,761,881 | 9/1973 | Anderson et al. | 340/172.5 |
| 3,803,560 | 4/1974 | DeVoy et al. | 340/172.5 |
| 3,864,670 | 2/1975 | Inoue | 395/182.1 |
| 3,889,237 | 6/1975 | Alferness et al. | 340/172.5 |
| 3,979,726 | 9/1976 | Lange et al. | 340/172.5 |
| 4,020,466 | 4/1977 | Cordi et al. | 340/172.5 |
| 4,044,337 | 8/1977 | Hicks et al. | 364/200 |
| 4,164,017 | 8/1979 | Randell et al. | 364/200 |
| 4,228,496 | 10/1980 | Katzman et al. | 364/200 |

(List continued on next page.)

FOREIGN PATENT DOCUMENTS

| | | | |
|---|---|---|---|
| 0 260 625 A1 | 3/1988 | European Pat. Off. | G06F 9/46 |
| 0 299 511 | 1/1989 | European Pat. Off. | G06F 11/16 |
| 0 441 087 A1 | 8/1991 | European Pat. Off. | G06F 11/20 |
| 0457 308 A2 | 11/1991 | European Pat. Off. | G06F 11/20 |
| 2.028.517 | 9/1970 | France | G06F 15/00 |
| 2 606 184 | 5/1988 | France | G06F 11/16 |
| 41 36 729 A1 | 5/1992 | Germany | G06F 12/08 |
| 55-41528 (A) | 3/1980 | Japan. | |

(List continued on next page.)

OTHER PUBLICATIONS

IBM Technical Disclosure Bulletin, vol. 34, No. 10A, Mar. 1992, Memory Recovery Facility for Computer Systems; pp. 341–342.

1991 IEEE, IACOPONI, 'Hardware Assisted Real-Time Rollback in the Advanced Fault-Tolerant Data Processor; pp. 269–274.

IEEE, vol. 4, No. 6, Dec. 1992, Incremental Recovery in Main Memory Database pp. 529–540, by Eliezer Levy, et al.

IEEE, No. 2, Feb. 1988, "Sequoia: A Fault-Tolerant Tightly Coupled Multiprocessor Transaction Processing," pp. 37–45, by Philip A. Berstein.

IEEE, Dec. 1991, The Diffusion Model Based Task Remapping for Distributed Real-pp. 2–11, by Morikazu Takegaki, et al.

(List continued on next page.)

Primary Examiner—Joseph Palys
Attorney, Agent, or Firm—Wolf, Greenfield & Sacks, P.C.

[57] ABSTRACT

A mechanism for maintaining a consistent state in main memory without constraining normal computer operation is provided, thereby enabling a computer system to recover from faults without loss of data or processing continuity. In a typical computer system, a processor and input/output elements are connected to a main memory via a memory bus. A shadow memory element, which includes a buffer memory and a main storage element, is also attached to this memory bus. During normal processing, data written to primary memory is also captured by the buffer memory of the shadow memory element. When a checkpoint is desired (thereby establishing a consistent state in main memory to which all executing applications can safely return following a fault), the data previously captured in the buffer memory is then copied to the main storage element of the shadow memory element. This structure and protocol can guarantee a consistent state in main memory, thus enabling fault-tolerant operation.

33 Claims, 5 Drawing Sheets

U.S. PATENT DOCUMENTS

| | | | |
|---|---|---|---|
| 4,373,179 | 2/1983 | Katsumata | 364/200 |
| 4,393,500 | 7/1983 | Imazeki et al. | 371/13 |
| 4,403,284 | 9/1983 | Sacarisen et al. | 364/200 |
| 4,413,327 | 11/1983 | Sabo et al. | 364/900 |
| 4,426,682 | 1/1984 | Riffe et al. | 364/200 |
| 4,435,762 | 3/1984 | Milligan et al. | 364/200 |
| 4,459,658 | 7/1984 | Gabbe et al. | 364/200 |
| 4,484,273 | 11/1984 | Stiffler et al. | 364/200 |
| 4,503,534 | 3/1985 | Budde | 371/9 |
| 4,509,554 | 4/1985 | Glazer et al. | 364/200 |
| 4,566,106 | 1/1986 | Check, Jr. | 371/67 |
| 4,654,819 | 3/1987 | Stiffler et al. | 364/900 |
| 4,703,481 | 10/1987 | Fremont | 371/12 |
| 4,734,855 | 3/1988 | Banatre et al. | 364/200 |
| 4,740,969 | 4/1988 | Fremont | 371/12 |
| 4,751,639 | 6/1988 | Corcoran et al. | 364/200 |
| 4,817,091 | 3/1989 | Katzman et al. | 395/182.06 |
| 4,819,154 | 4/1989 | Stiffler et al. | 364/200 |
| 4,819,232 | 4/1989 | Krings | 371/9 |
| 4,823,261 | 4/1989 | Bank et al. | 364/200 |
| 4,905,196 | 2/1990 | Kirrmann | 365/200 |
| 4,912,707 | 3/1990 | Kogge et al. | 371/12 |
| 4,924,466 | 5/1990 | Gregor et al. | 371/12 |
| 4,941,087 | 7/1990 | Kap | 364/200 |
| 4,958,273 | 9/1990 | Anderson et al. | 364/200 |
| 4,959,774 | 9/1990 | Davis | 364/200 |
| 4,965,719 | 10/1990 | Shoens et al. | 364/200 |
| 4,996,687 | 2/1991 | Hess et al. | 371/10.1 |
| 5,123,099 | 6/1992 | Shibata et al. | 395/425 |
| 5,157,663 | 10/1992 | Major et al. | 371/9.1 |
| 5,214,652 | 5/1993 | Sutton | 371/9.1 |
| 5,235,700 | 8/1993 | Alaiwan et al. | 395/575 |
| 5,239,637 | 8/1993 | Davis et al. | 395/425 |
| 5,247,618 | 9/1993 | Davis et al. | 395/275 |
| 5,263,144 | 11/1993 | Zurawski et al. | 395/425 |
| 5,269,017 | 12/1993 | Hayden et al. | 395/575 |
| 5,271,013 | 12/1993 | Gleeson | 371/9.1 |
| 5,276,848 | 1/1994 | Gallagher et al. | 395/425 |
| 5,293,613 | 3/1994 | Hayden et al. | 395/575 |
| 5,301,309 | 4/1994 | Sugano | 395/575 |
| 5,313,647 | 5/1994 | Kaufman et al. | 395/700 |
| 5,325,517 | 6/1994 | Baker et al. | 395/575 |
| 5,325,519 | 6/1994 | Long et al. | 395/575 |
| 5,327,532 | 7/1994 | Ainsworth et al. | 395/200 |
| 5,363,503 | 11/1994 | Gleeson | 395/575 |
| 5,369,757 | 11/1994 | Spiro et al. | 395/575 |
| 5,381,544 | 1/1995 | Okazawa | 395/575 |
| 5,394,542 | 2/1995 | Frey et al. | 395/575 |
| 5,398,331 | 3/1995 | Huang | 395/182.1 |
| 5,408,636 | 4/1995 | Santeler | 395/425 |
| 5,408,649 | 4/1995 | Beshears et al. | 395/575 |
| 5,418,916 | 5/1995 | Hall | 395/375 |
| 5,418,940 | 5/1995 | Mohan | 395/375 |
| 5,420,996 | 5/1995 | Aoyagi | 395/425 |
| 5,448,719 | 9/1995 | Schultz et al. | 395/182.03 |
| 5,463,733 | 10/1995 | Forman et al. | 395/182.08 |
| 5,485,585 | 1/1996 | Huynh et al. | 395/311 |
| 5,488,716 | 1/1996 | Schneider et al. | 395/182.08 |
| 5,495,587 | 2/1996 | Comfort et al. | 395/375 |
| 5,495,590 | 2/1996 | Comfort et al. | 395/800 |
| 5,504,861 | 4/1996 | Crockett et al. | 395/182.11 |
| 5,530,801 | 6/1996 | Kobayashi | 395/182.11 |
| 5,530,946 | 6/1996 | Bouvier et al. | 395/182.21 |
| 5,557,735 | 9/1996 | Pinkston, II et al. | 395/180 |
| 5,566,297 | 10/1996 | Devarakonda et al. | 395/182.13 |
| 5,568,380 | 10/1996 | Brodnax | 364/184 |
| 5,574,874 | 11/1996 | Jones et al. | 395/376 |
| 5,583,987 | 12/1996 | Kobayashi et al. | 395/182.11 |
| 5,630,047 | 5/1997 | Wang | 395/182.13 |
| 5,644,742 | 7/1997 | Shen et al. | 395/591 |
| 5,649,136 | 7/1997 | Shen et al. | 395/591 |
| 5,649,152 | 7/1997 | Ohran et al. | 395/441 |

FOREIGN PATENT DOCUMENTS

| | | |
|---|---|---|
| 55-115121 | 9/1980 | Japan . |
| 58-31651 (A) | 2/1983 | Japan . |
| WO 84/02409 | 6/1984 | WIPO ............................ G06F 11/14 |

OTHER PUBLICATIONS

IBM Technical Disclosure Bulletin, vol. 36, No. 08, Aug. 1993, "Efficient Cache Access Through Compression." pp. 161–165.

N.Bowen and D.Pradhan, "Processor–and Memory–Based Checkpoint and Rollback Recovery," 1993 IEEE Transactions on Computers, pp. 22–30.

Y.Lee and K.Shin, "Rollback Propagation Detection and Performance Evaluation of FTMR$^2$M—A Fault Tolerant Multiprocessor," 1982 IEEE Transactions on Computers, pp. 171–180.

C.Kubiak et al., "Penelope: A Recovery Mechanism for Transient Hardware Failures and Software Errors," 1982 IEEE Transactions on Computers, pp. 127–133.

A.Feridun and K.Shin, "A Fault–Tolerant Multiprocessor System with Rollback Recovery Capabilities," 1981 IEEE Transactions on Computers, pp. 283–298.

P.Lee et al., "A Recovery Cache for the PDP–11," IEEE Transactions on Computers, vol. C–29, No. 6, Jun. 1980, pp. 546–549.

International Search Report as cited in PCT Application No. PCT/US95/07168, dated Oct. 11, 1995.

M. Banatre, A. Gefflaut, C. Morin, "Scalable Shared Memory Multi–Processors: Some Ideas to Make Them Reliable".

MAIN MEMORY SYSTEM AND CHECKPOINTING PROTOCOL FOR FAULT-TOLERANT COMPUTER SYSTEM

This application is a continuation application Ser. No. 08/258,165, filed Jun. 10, 1994, now abandoned.

SUMMARY OF THE INVENTION

This invention provides a mechanism for maintaining a consistent state in main memory without constraining normal computer operation, thereby enabling a computer system to recover from faults without loss of data integrity or processing continuity. In a typical computer system, a processor and input/output elements are connected to a main memory via a memory bus. In the invention, a shadow memory element, which includes a buffer memory and a main storage element, is also attached to this memory bus. During normal processing, data written to primary memory is also captured by the buffer memory of the shadow memory element. When a checkpoint is desired (thereby establishing a consistent state in main memory to which all executing applications can safely return following a fault), the data previously captured in the buffer memory is then copied to the main storage element of the shadow memory element. This structure and protocol can guarantee a consistent state in main memory, thus enabling fault-tolerant operation.

DETAILED DESCRIPTION

The present invention will be more completely understood through the following detailed description which should be read in conjunction with the attached drawing in which similar reference numbers indicate similar structures. All references cited herein are hereby expressly incorporated by reference.

A computer system must guarantee the existence of a consistent state in main memory (i.e., a "checkpoint") to which all application programs can return following a fault if it is to be able to recover transparently from the fault. It is highly desirable for the computer system to provide this capability without placing any special requirements on application programs using it. In some currently available computer systems, a consistent state is assured by storing all modifiable data in two physically disjoint locations (a primary location and a shadow location) in main memory. U.S. Pat. Nos. 4,654,819 and 4,819,154 further describe such a computer system. For this procedure to work, however, each processor in the computer system must have a blocking cache; that is, the processor cannot write any cache line back to main memory unless it writes back all currently modified lines at the same time. Thus, any cache overflow or request for data in the cache from another processor forces the processor to flush the entire cache.

The major disadvantage of this approach is that it precludes the use of more conventional non-blocking caches along with their associated cache-coherency protocols. Porting software from other computer systems to be used with such a computer system is difficult and performance problems are likely after the port is completed. Also, the use of unconventional hardware increases the cost of the computer system, whereas the use of standard commercially available processors would reduce its cost. Conventional processors also require the use of conventional cache protocols; however, previous checkpointing systems were unable to guarantee main memory consistency and thus to provide fault tolerant operation using conventional caches.

Figure 1:
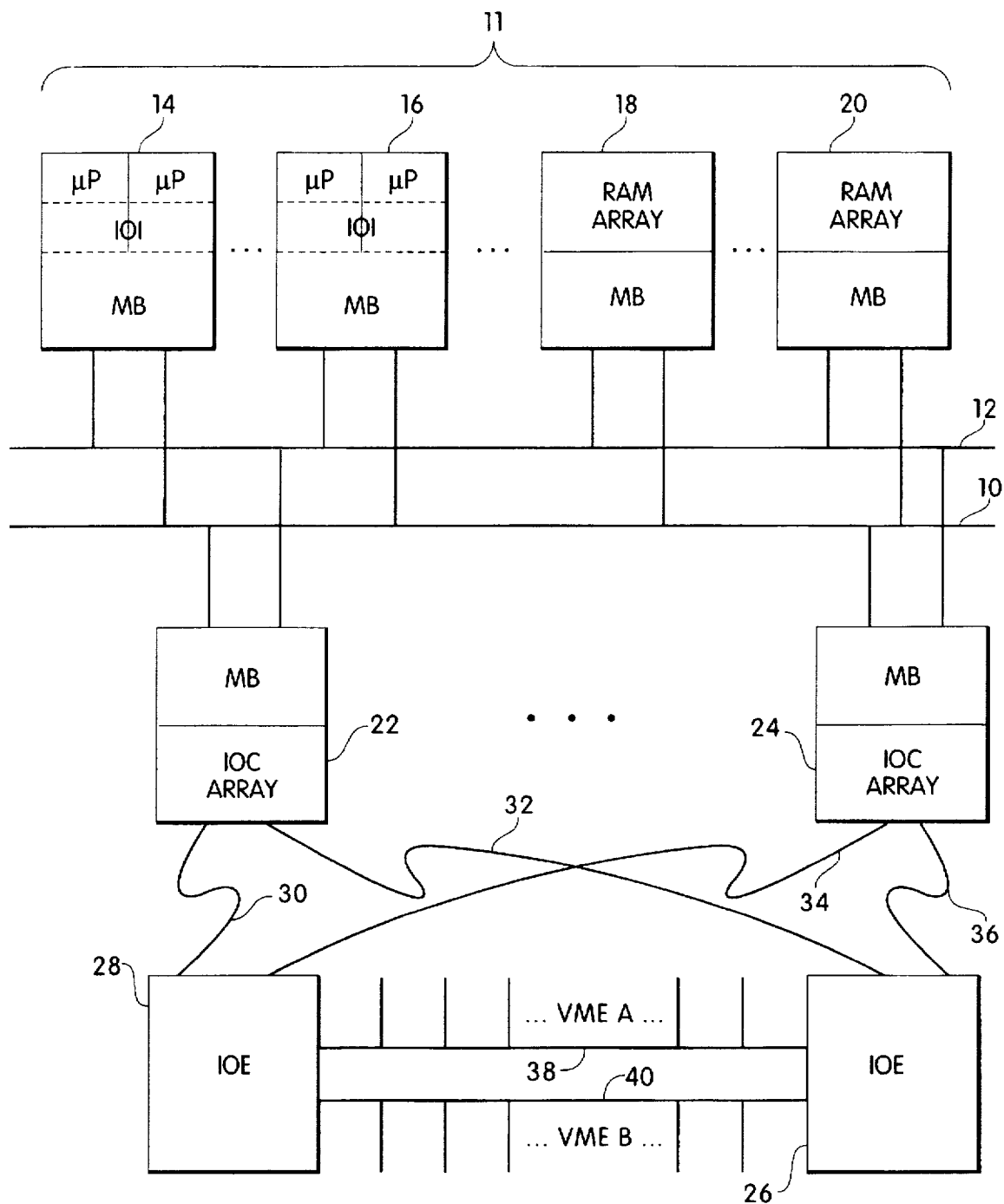
FIG. 1 is a block diagram of a fault tolerant computer system which uses the main memory structure of the present invention.

FIG. 1 is a block diagram of one embodiment of a fault tolerant computer system 11 embodying the invention. One or more processing elements 14 and 16 are connected to one or more main memory systems 18 and 20 via one or more buses 10 and 12. One or more input/output (I/O) subsystems 22 and 24 are also connected to the bus 10 (12). Each I/O subsystem comprises an input/output (I/O) element 26 (28) and one or more buses 30 and 32 (34 and 36). An I/O element 26 (28) may also be connected to any standard I/O bus 38 (40), such as a VME bus. For ease of description, only one of each of these systems and subsystems are referred to below.

Figure 2:
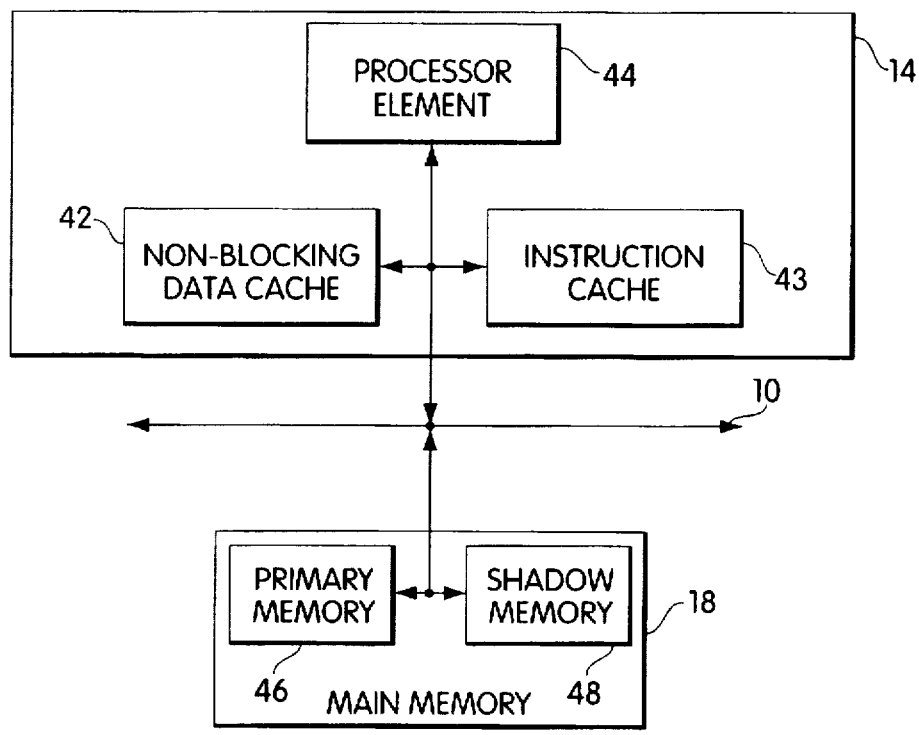
FIG. 2 is a block diagram illustrating in more detail a processing unit with a cache and a shadowed main memory.

As shown in FIG. 2, each processing element, e.g., 14, includes a processing unit 44 connected to a cache 42. This connection also connects the processing unit 44 and the cache 42 to the bus 10. The processing unit 44 may be any standard microprocessor unit (MPU). For example, the PENTIUM microprocessor, available from Intel Corporation, is suitable for this purpose. The processing unit 44 operates in accordance with any suitable operating system, as is conventional. A processing element 14 may include dual processing units 44 for self-checking purposes. The cache 42 is either a write-through or a write-back type of cache and has an arbitrary size and associativity. The processing unit 44 may store in the cache 42 either data only or both computer program instructions and data. In the former case, an additional similar instruction cache 43 may be connected to the processing unit 44 for the processing unit 44 to store computer program instructions. This connection also connects the instruction cache 43 to the bus 10. If this system is a symmetric multiprocessing computer system, each processing unit 44 may use any conventional mechanism to maintain cache coherency, such as bus snooping.

The cache 42 is connected to a main memory system, e.g., 18, via bus 10. The main memory system includes a primary memory element (PME) 46 and a shadow memory element (SME) 48 which are interconnected and connected to bus 10. The PME 46 and the SME 48 must have equal, but arbitrary, capacities.

Figure 3:
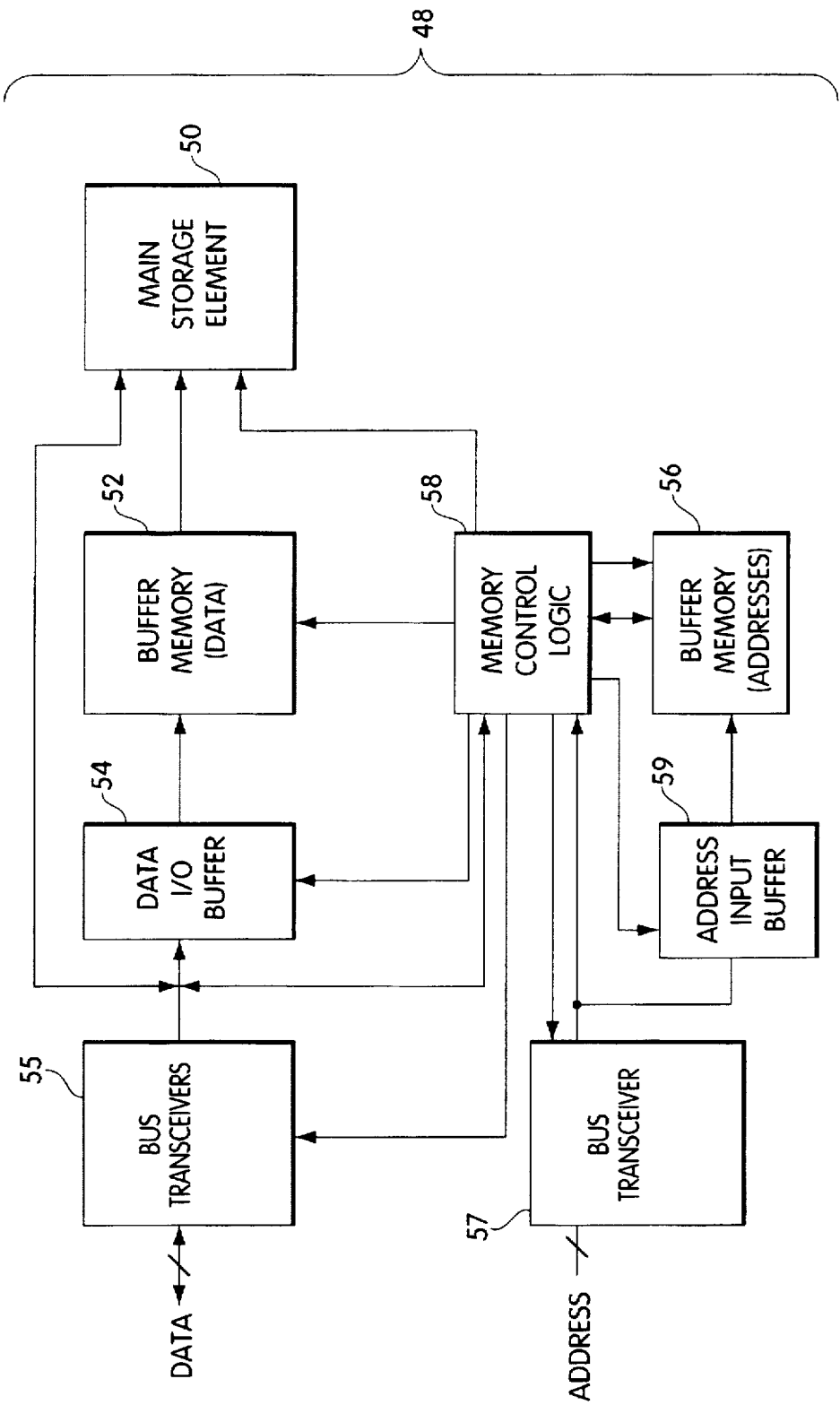
FIG. 3 is a more detailed block diagram of the shadow memory shown in FIG. 2.

The SME 48, as shown in FIG. 3, includes a buffer memory 52 and a main storage element 50, each having data inputs, data outputs and control inputs including access control and address inputs. The buffer memory and main storage element are typically implemented as dynamic, volatile, random-access memories (DRAMs), in the form of integrated circuits, typically, single in-line memory modules (SIMMs). A bus transceiver 55 connects the inputs of a data input buffer 54 and data outputs of the main storage element 50 to bus 10. Outputs of the data input buffer 54 are connected to the data inputs of buffer memory 52 and the data inputs of main storage element 50. The data outputs of the buffer memory 52 are also connected to the data inputs of the main storage element 50. Memory control logic 58 has control outputs which are connected to control inputs of each of the buffer memory 52, main storage element 50, data input buffer 54 and bus transceiver 55 to control the flow of data among those elements, in a manner which is described below. Memory control logic 58 also has data paths connected to bus 10 through the bus transceiver 55, a first address input connected to the address portion of bus 10 via bus transceiver 57 and a second address input connected to the data outputs of an address buffer memory 56. The address buffer memory 56 is also connected to outputs of an address input buffer 59, of which outputs are connected to the address portion of bus 10 via bus transceiver 57. Both bus transceiver 57 and address input buffer 59 have a control input connected to the memory control logic 58. The memory control logic 58 also controls storage in the address buffer memory 56 of addresses which correspond to data stored in the buffer memory 52, in a manner which is described below. The non-memory logic elements may be implemented using conventional circuitry, custom or semi-custom integrated circuits or programmable gate arrays.

Since it may be advantageous to keep the number of module types to a minimum, the PME's 46 may also have the same structure as the SME's 48. The buffer memory 52 in a memory element used as a PME 46 may store computer program instructions or read-only data which does not have to be shadowed. The memory control logic 58 in a memory element is preferably programmable to enable the memory element to be either a PME or an SME.

The buffer memory 52 should be large enough to capture all data modified between any pair of cache flushes. Given the process described below for using this system, the total capacity of all of the buffer memories 52 combined in computer system 11 should preferably be (at least) larger than the combined capacity of the caches 42 in the computer system 11.

Figure 4:
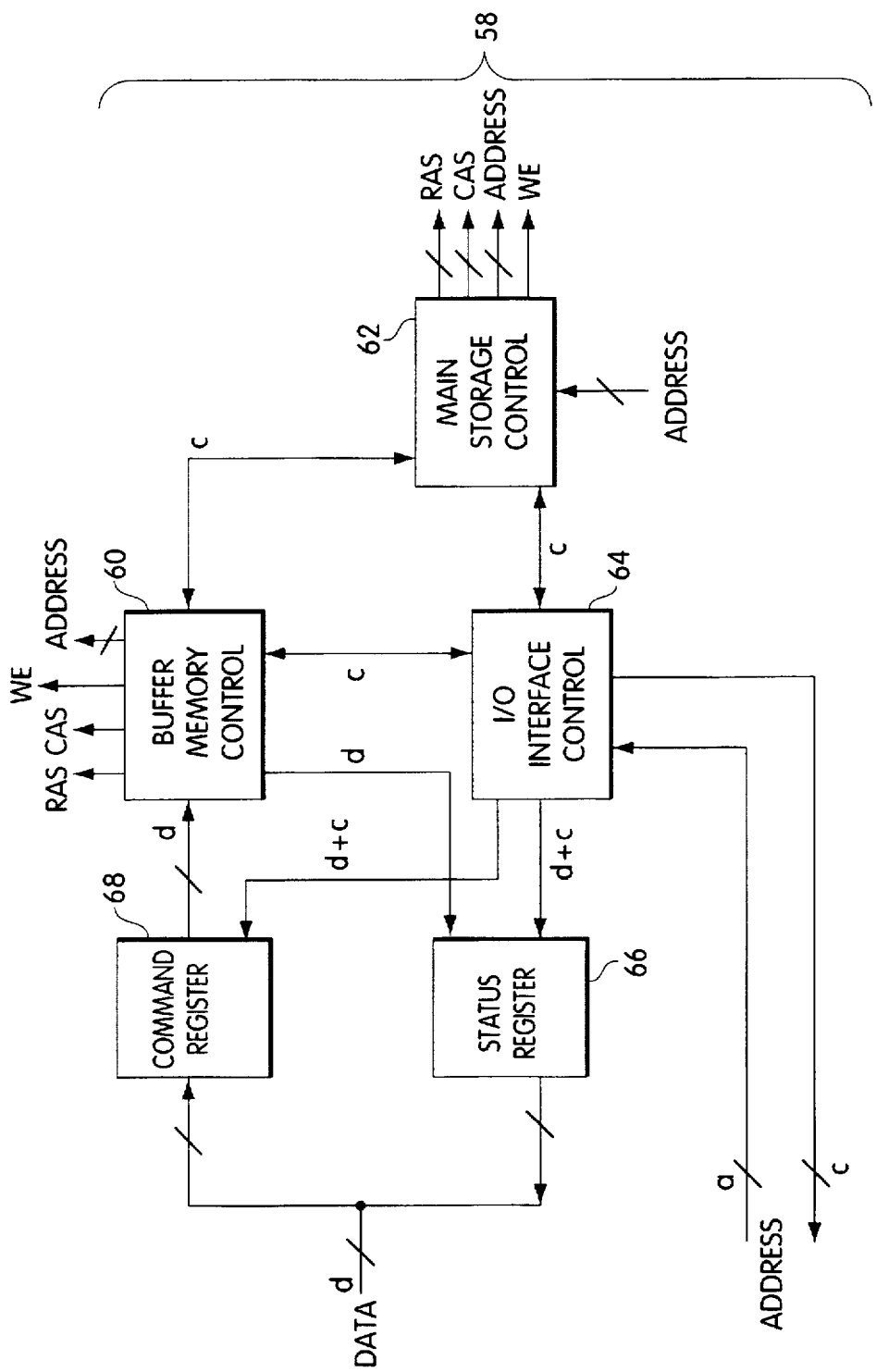
FIG. 4 is a more detailed block diagram of the memory control logic shown in FIG. 3.

The memory control logic 58 is illustrated in more detail in FIG. 4. It includes a command register 68 which has data input connected to bus 10 via the bus transceiver 55. A status register 66 has an output also connected to the bus 10 via bus transceiver 55. Buffer memory control circuit 60 and main storage control circuit 62 provide the row address strobe (RAS), column address strobe (CAS), row and column addresses and write enable (WE) control signals to the buffer memory 52 and main storage element 50, respectively. Control circuit 60 and 62 also have connections for coordinating data transfer between buffer memory 52 and main storage element 50. Buffer memory control circuit 60 has an output connected to the input of the status register 66 to indicate how full the buffer memory 52 is and whether copying from the buffer memory 52 to main storage element 50 is complete. Buffer memory control circuit 60 also has an input connected to the output of command register 68 which indicates whether it should copy data between the buffer memory 52 and the main storage element 50. The command register also indicates whether the memory element is a primary memory element or a shadow memory element. An I/O interface control 64 controls the flow of information through the status register 66 and command register 68, and coordinates data transfers through the bus transceivers 55 and 57 with the buffer memory control circuit 60 and main storage control circuit 62. The I/O interface control 64 also accepts inputs from the address portion of bus 10, so as to recognize addresses to the command and status registers and to the main memory system itself.

The process of using this system to maintain memory consistency following a fault will now be described. This process allows data to be passed from one processing element 14 to another processing element 16 without requiring the entire cache 42 of processing unit 14 to be flushed. Since all processing units 44 in the computer system 11 have access to all buses, each processing unit 44 may use conventional bus snooping methods to assure cache coherency. If all processing units 44 do not have access to all system buses, the processing units 44 may use other well-known cache coherency techniques instead.

The buffer memory 52 in each shadow memory element 48 allows consistency to be maintained in the main memory system 18 in the event of a fault. All data lines that are stored in one primary memory element 46 are also stored in the buffer memory 52, along with their corresponding memory (physical) addresses which are stored in the associated address buffer memory 56 in the shadow memory element 48. The protocol also applies to lines written to the primary memory element 46 when a cache 42 is flushed by the operating system using either specially designed flushing hardware or conventional cache flushing processor instructions. Flushing operations by the processing units 44 are synchronized. When all processing units 44 have completed their flush, the operating system instructs the shadow memory element 48, using command register 68, to copy, using main storage control circuit 62, the contents of the buffer memory element 52 into its main storage element 50. To maintain consistency, once a processing element 14 has begun a flush, it cannot resume normal operation until all other processing elements 14 have completed their flushes.

Processor cache flushing is synchronized because the buffer memory needs to know which data should be copied to the main storage element 50, and which data should not. That is, the buffer memory needs to distinguish between post-flush and pre-flush data. Thus, if the buffer does not know what processor is sending data, all processors must complete their flushes before normal operation can begin in order to maintain consistency. Synchronization is preferably controlled using a test-and-set lock operation using a designated location in main memory 18, such as indicated at 80 in FIG. 5, to store the lock value. At periodic intervals, each processing unit 44 determines whether it should initiate a flush operation as indicated at step 90 in FIG. 6. The processing unit 44 can make this determination in a number of different ways. For example, one or more bits in the status register 66 of the shadow memory element 48 could be used to indicate the remaining capacity of the buffer memory 52. If the buffer memory 52 is too full, a processing unit 44 initiates a flush. Also, a flush may be initiated after a fixed period of time has elapsed. If this processing unit 44 does not need to initiate a flush, then it examines the designated memory location 80 to determine whether another processing unit 44 has already set the lock (step 92). If the lock is not set, this process ends as indicated at 94. Otherwise, if the lock is set, this processing unit 44 flushes its cache 42 in step 96. The effect of the flushing operation is to store all lines in the cache (or preferably only those lines that have been modified since the last flush) to the primary memory element 46, and, because of the aforementioned properties of the shadow memory element 48, to the buffer memory 50 of the shadow memory element 48 as well. Prior to the actual flushing operation, the processing unit 44 saves its state in the cache 42 so that this information is flushed as well.

If the processing unit 44 determines in step 90 that it should initiate a flush, it then determines whether the lock is already set in step 98, similar to step 92. If the lock is already set, the processing unit 44 continues by flushing its cache 42 in step 96. Otherwise, it sets the lock in step 100, and identifies itself as the initiator of the flush before flushing its cache 42.

Figure 5:
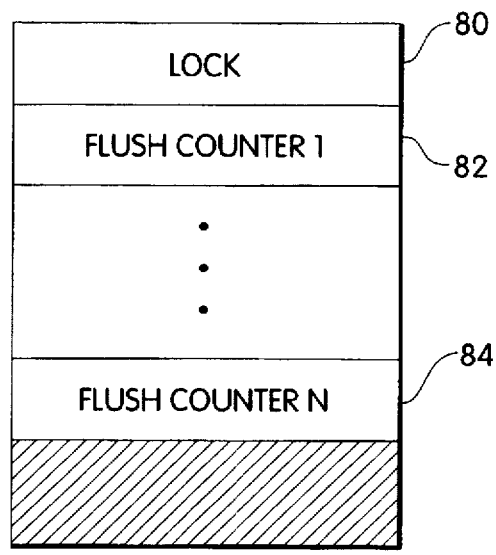
FIG. 5 is a diagram of memory locations used by the processing units to maintain main memory consistency.

After a processing unit 44 flushes its cache 42 in step 96, it increments its corresponding flush counter in step 102. As indicated in FIG. 5, each processing unit 44 has a flush counter, such as shown at 82 and 84, which are predetermined designated locations in main memory 18. After the flush counter (e.g., 82) is incremented, the processing unit 44 determines whether it is the initiator of this flush sequence (step 104). If it is not the initiator, it then waits until the lock is released in step 106. When the lock is released, this process ends in step 108 and the processing unit 44 may resume normal operations.

If the processing unit 44 is the initiator of the flush as determined in step 104, it then waits until all flush counters (82-84) are incremented in step 110. Once all flush counters have been incremented, this processing unit 44 instructs the shadow memory element 48 to begin copying data in the buffer memory 52 into the main storage element 50, by sending a command to the command register 68, and releases the lock (step 112). Receipt of the command notifies the shadow memory element 48 that the flush has completed and causes the buffer memory control 60 in conjunction with the main storage control 62 to move the data that was stored in the buffer memory 52 into the appropriate locations (as determined by the corresponding physical address stored in address buffer memory 56) in the main storage element 50. Once this command has been sent, the flush lock is released and the processing units 44 can resume normal processing. The loops around steps 106 and 110 should have time-out protection which triggers fault recovery procedures, in the event of a failure during flushing operations.

The buffer memory control 60 can distinguish between pre-flush and post-flush data, for example, by storing the last address of buffer memory 52 in which data is stored at the end of each synchronized flushing operation. There are other ways to identify such a boundary, for example by monitoring the addresses of buffer memory 52 from which data has been copied, or by counting how much data has been written to buffer memory 52. All data stored in addresses in buffer memory 52 between the address stored for the (i-1)th flush and the address stored for the ith flush is pre-flush data. Any data stored in an address outside of that range is post-flush data which is not copied to the main storage element 50. Any (i+1)th flush data may be placed in any area of the buffer memory 52 which has been copied to the main storage element.

These operations ensure the existence of a consistent state in main memory 18 to which the computer system 11 can safely return following a fault. If the fault affects any portion of the computer system 11 other than the shadow memory element 48 itself, the shadow memory element 48 contains the state of main memory 18 following the last completed flush. If data was being moved from the buffer memory 52 to the main storage element 50 at the time of the fault, this operation has to be completed before normal processing can resume. Since, as part of the flushing operation, each processing unit 44 has stored the processing state that existed at the time that the flush was initiated, all running tasks have been saved in a consistent state in main memory 18. Following a fault, the contents of the shadow memory element 48 can either be copied to the corresponding primary memory element 46, if it is still operational, or the shadow memory element 48 can take over the role of the primary memory element 46. In either event, normal processing can resume from that saved state.

If the fault was in the shadow memory element 48 itself, then the remainder of the computer system 11 is unaffected. The only consequence is that the computer system 11 no longer has the ability to recover if a second fault should occur before the shadow memory element 48 is repaired.

Overflow of a buffer memory 52 is also not fatal. The contents of the associated shadow memory element 48 can always be restored by copying the contents of its associated primary memory element 46. Since the system may not be able to recover from a fault during this interval, however, it is important that the probability of such an overflow be kept to a minimum.

This checkpointing protocol allows data to be written to a primary memory element 46 at any time. Consequently, a single cache line can be written to a primary memory element 46 without forcing the entire cache 42 to be flushed, thereby relaxing the requirement for a large, associative cache. Further, data can be passed from cache 42 of one processing unit 44 to cache 42 of another processing unit 44 so long as it is simultaneously updated in the primary memory element 46 and in the buffer memory 52 in the shadow memory element 48. Significant performance advantages can be obtained using this protocol in a multi-processing system in which shared data is frequently passed from the processing element (e.g., 14) to another processing element (e.g., 16).

If a standard bus protocol is used to implement this process, a shadow memory element 48 remains passive so far as the bus 10 is concerned. It simply stores in its buffer memory 52 all data written to its corresponding primary memory element 46. In order for the shadow memory element 48 to accept data synchronously with the primary memory element 46 the data input buffer 54 temporarily stores the data because a line may be in the process of being copied from the buffer memory 52 to the main storage 50 at the time of the write.

Figure 6:
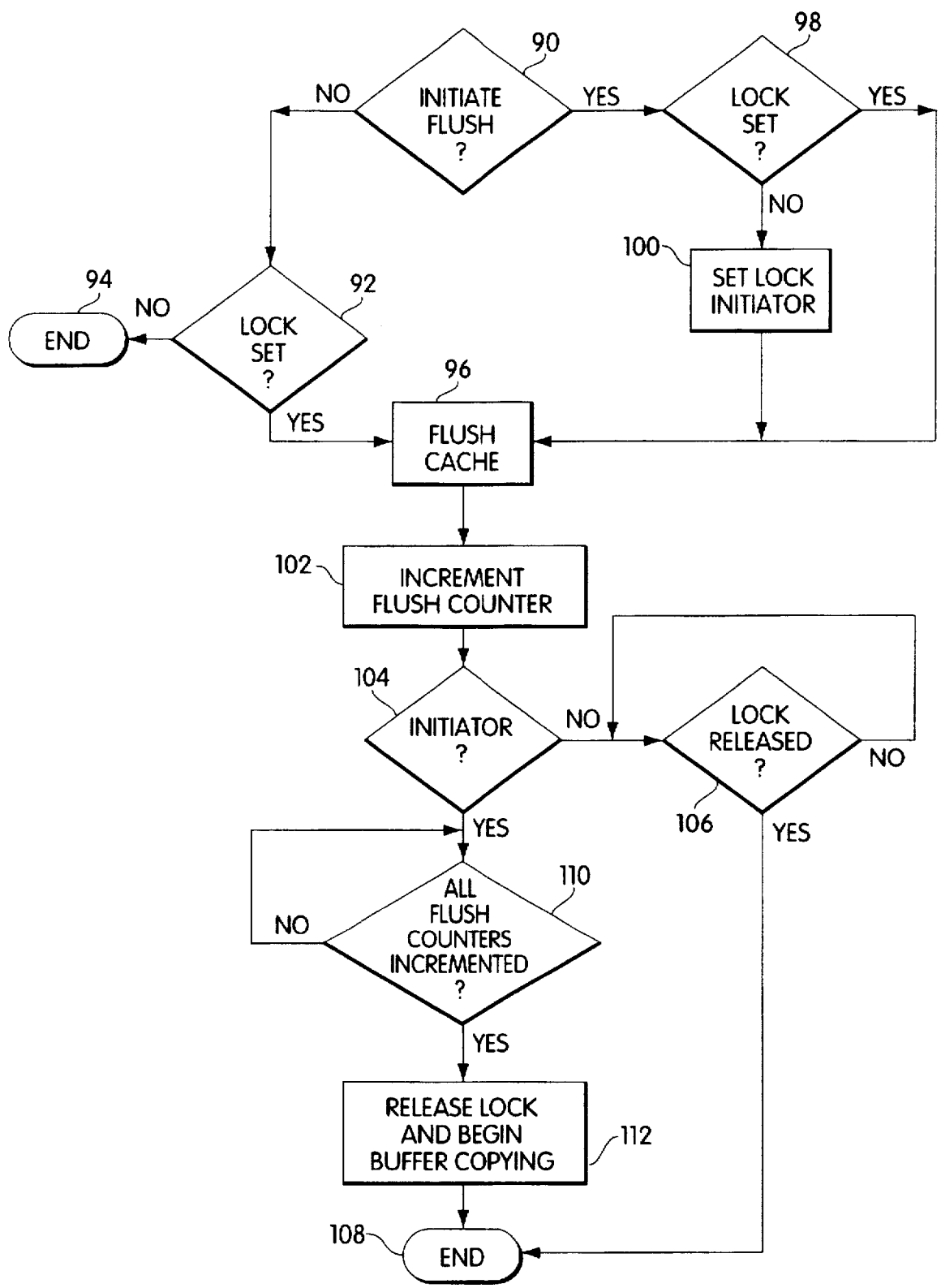
FIG. 6 is a flowchart describing how each processing unit controls flushing of its cache to maintain main memory consistency.

Some performance advantage can be gained if certain non-standard bus protocols are also implemented. For example, if the bus protocol allows the shadow memory element 48 to distinguish between processing elements 14, or at least to identify whether a line being stored has been written by a processing element 14 that has completed its ith flush or is still executing its ith flush, a processing element 14 does not have to wait until all other processing elements have completed their flushes before it resumes normal operation. In this case, consistency is maintained in main memory by requiring a processing element 14 to suspend normal operation after completing its ith flush, only until all other processing elements 16 have also at least begun (but not necessarily completed) their ith flushes. This relaxed synchronization restriction still achieves checkpoint consistency. That is, it guarantees that a processing element 16 that has not begun its flush does not receive post-flush modified data from another processing element 14 that has completed its flush and resumed normal processing. This less restrictive synchronization protocol can be allowed if the logic associated with the buffer memory 52 can distinguish between data that is being written as part of the flushing operation (and hence must be stored in the part of the buffer memory 52 that is to be stored to the main storage element 50 as soon as all processing elements 14 have completed their flushes) and data that is being written by a processing element 14 that has completed its flush (and hence is not to be transferred to main storage element 50 until the next flush is completed). To implement this protocol, the order and placement of steps 96 and 102 in FIG. 6 are reversed.

Other non-standard bus protocol features, while also not necessary to support memory consistency, can be introduced to decrease recovery times following a fault by reducing memory-to-memory copy time. Two such features are the ability to support "dual-write" and "copy" memory access modes. If a line is stored in dual-write mode, both the primary memory element 46 and the shadow memory element 48 store the line in the main storage element 50. (Thus, the shadow memory element 48 does not store this data in the associated buffer memory 52). In copy mode, the primary memory element 46 sources the addressed line and the shadow memory element 48 stores the resulting data to the corresponding location in the main storage element 50.

It may also be useful to provide the capability for a memory element to operate in a "phantom mode" in which it acts like a primary memory element for accesses over some designated range of addresses, but like a shadow for all other addresses. This mode allows the computer system 11 to operate with some PMEs 46 shadowed and others unshadowed. Such a feature may be useful, for example, when a portion of the primary memory has failed and no replacement is immediately available, but the remainder of primary memory is still functioning normally.

Given the embodiments of the invention described here, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention as defined by the appended claims.

What is claimed is:

1. A computer system which periodically establishes a consistent checkpoint of a current state of the computer system for supporting fault-tolerant operation, the computer system comprising:

a processor having a cache and internal resisters and connected to a main memory system;

wherein the main memory system includes:

i) a primary memory element;

ii) a buffer memory element connected to the primary memory element such that selected accesses to the primary memory element are captured in the buffer memory element simultaneously with the access to the primary memory element;

iii) a shadow storage element connected to the buffer memory;

iv) means for copying data from the buffer memory element to the shadow storage element in response to an instruction to perform such copying from the processor; and wherein the processor includes means for suspending operations, means for flushing the cache and internal registers and means for instructing the means for copying after flushing of the cache and internal registers has completed.

2. The computer system of claim 1, wherein the buffer memory element and the shadow storage element are configured as a single unit, and wherein the primary element is implemented with an identical unit.

3. The computer system of claim 2, wherein the primary memory element includes a first programmable element that configures the primary memory element as a primary memory element, and wherein the single unit includes a second programmable element that configures the single unit as a buffer memory element and a shadow storage element.

4. The computer system of claim 1, wherein the processor includes a plurality of processors, each of the plurality of processors having a cache.

5. The computer system of claim 4, further including means for initiating a flush of each cache.

6. The computer system of claim 5, wherein the means for initiating include means for initiating the flush a predetermined time subsequent to a previous flush.

7. The computer system of claim 5, wherein the means for initiating includes means for determining an amount of unused memory space within the buffer memory.

8. The computer system of claim 5, further including means for flushing data of each cache into the buffer memory.

9. The computer system of claim 8, wherein the means for flushing includes means for flushing only data that has been modified since a previous flush.

10. The computer system of claim 4, wherein each cache includes:

a data cache for storing data; and an instruction cache for storing instructions.

11. The computer system of claim 4, each of the plurality of processors including means for maintaining cache coherency.

12. The computer system of claim 1, further comprising means for determining an amount of data currently stored in the buffer memory with respect to a capacity of the buffer memory.

13. The computer system of claim 1, further comprising means for determining when a copying operation from the buffer memory to the shadow storage element has been completed.

14. A memory system for use with at least two processors, each connected to the memory system and having a cache of arbitrary size and internal registers, wherein the cache and internal registers of each processor are periodically flushed by the processors in synchronization, comprising:

a primary memory element;

a buffer memory physically disjoint from and connected to the primary memory such that selected accesses to the primary memory element are captured in the buffer memory element simultaneously with the access to the primary memory element;

a shadow storage element connected to the buffer memory and physically disjoint from the primary memory and the buffer memory;

means for copying data in the buffer memory to appropriate locations in the shadow storage element when the processors complete flushing of their caches and internal registers, thereby establishing a consistent checkpoint in the memory system from which processing can resume without loss of data integrity or program continuity following a fault.

15. The computer system of claim 14, wherein the buffer memory element and the shadow storage element are configured as a single unit, and wherein the primary memory element is implemented with an identical unit.

16. The computer system of claim 15, wherein the primary memory element includes a first programmable element that configures the primary memory element as a primary memory element, and wherein the single unit includes a second programmable element that configures the single unit as a buffer memory element and a shadow storage element.

17. The memory system of claim 14, further comprising means for determining an amount of data currently stored in the buffer memory with respect to a capacity of the buffer memory.

18. The memory system of claim 14, further comprising means for determining when a copying operation from the buffer memory to the shadow storage element has been completed.

19. In a computer system having first processor with a first cache and a second processor with a second cache, each cache being connected to a main memory and for caching data from the main memory, the main memory comprising a primary memory, a buffer memory connected to the primary memory, and a shadow storage element connected to the buffer memory, a method for synchronizing flushing of the first and second caches to maintain a consistent state in the main memory, the method comprising the steps, performed by the first processor, of:

setting a lock and suspending normal operations;

flushing the first cache such that the buffer memory and the primary memory simultaneously capture data flushed from the first cache;

waiting until the second processor completes flushing of the second cache such that the buffer memory and the primary memory simultaneously capture data flushed from the second cache;

instructing the buffer memory to copy data captured therein to the shadow storage element; and releasing the lock and resuming normal operations.

20. The method of claim 19, wherein the step of flushing includes storing only data that has been modified since a previous flush.

21. The method of claim 19, further including a step, prior to flushing the first cache, of storing a processing state of the first processor in the first cache.

22. The method of claim 19, further including a step, performed by each of the first processor and the second processor, of incrementing a flush counter when a flush operation has been completed.

23. A method for checkpointing a computer system having a first processor that has a first cache and first internal registers a second processor that has a second cache and second internal registers, wherein the first and second caches hold data accessed from a primary memory by the first and second processors, and wherein the processor may modify said data, the method comprising the steps, performed by the first processor, of:

sustaining execution of a process;

flushing the first cache and first internal registers to copy all modified data to a primary memory; and confirming that the second processor has flushed all modified data from the second cache and second internal registers to the primary memory; and resuming execution of the process.

24. A checkpoint memory element for a main memory for use in a computer system having a processor connected to the main memory wherein the main memory has a primary memory element, comprising:

a buffer memory connected to the primary memory element such that the buffer memory captures selected accesses to the primary memory element simultaneously with the access to the primary memory element an having an output indicative of how full the buffer memory is;

a shadow storage element connected to the buffer memory; and a memory control logic circuit, connected to the shadow storage element and the buffer memory and having outputs to control the shadow storage element and the buffer memory to copy data from the buffer memory to the shadow storage element in response to the buffer memory and instructions from the processor.

25. The checkpoint memory element of claim 24, wherein the memory control logic circuit includes:

a buffer memory control circuit, coupled to the buffer memory, having memory control signal outputs that control the buffer memory;

a command register, coupled to the buffer memory control circuit, for storing commands;

a status register, coupled to the buffer memory control circuit, for storing status information;

a shadow storage control circuit, coupled to the buffer memory control circuit, having memory control signal outputs that control the shadow storage element; and an input/output interface control circuit, coupled to the buffer memory control circuit, the command register, and the status register, having outputs that control information flow among the status register, command register, buffer memory control circuit, and shadow storage control circuit.

26. The checkpoint memory element of claim 25, wherein the buffer memory control circuit includes:

an output indicative of whether copying from the buffer memory to the main storage element is complete.

27. The checkpoint memory element of claim 24, further including:

a data input buffer coupled to the buffer memory for temporarily storing data to be stored in the buffer memory;

an address buffer memory, coupled to the memory control logic, that stores information indicative of addresses corresponding to data stored in the buffer memory; and an address input buffer, coupled to the memory control logic and the buffer memory, that provides the addresses corresponding to data stored in the buffer memory to the address buffer memory.

28. A checkpoint memory element for a main memory system for use in a computer system having a processor connected to a primary memory element comprising:

a buffer memory connected to the primary memory element such that selected accesses to the primary memory element are captured in the buffer memory simultaneously with the access to the primary memory element;

a shadow storage element connected to the buffer memory; means for copying data from the buffer memory to the shadow storage element in response to an instruction to perform such copying from the processor; and means for determining an amount of data currently stored in the buffer memory with respect to a capacity of the buffer memory.

29. In a computer system having first processor with a first cache and first internal registers and a second processor with a second cache and second internal registers, each cache being connected to a main memory and for caching data from the main memory, the main memory comprising a primary memory, a buffer memory connected to the primary memory such that selected accesses to the primary memory are captured in the buffer memory simultaneously with the access to the primary memory, and a shadow storage element connected to the buffer memory, a method for synchronizing flushing of caches and internal registers to maintain a consistent state of the computer system in the main memory, the method comprising the steps, performed by the first processor, of:

setting a lock and suspending normal operations;

flushing the first cache and the first internal registers to the primary memory such that the buffer memory captures data flushed from the first cache and first internal registers;

waiting until the second processor commences flushing of the second cache and second internal registers such that the buffer memory captures data flushed from the second cache and second internal registers;

identifying which processor has written the data in the buffer memory:

instructing the buffer memory to copy data flushed from each processor having completed flushing and captured in the buffer memory to the shadow storage element; and releasing the lock and resuming normal operations.

30. A method for maintaining a consistent state of a computer system in main memory to support fault tolerance in the computer system, wherein the computer system includes a first computer having a first cache and internal registers, a second computer having a second cache and internal registers, wherein the first and second caches hold data accessed from a primary memory by the first and second processors, and wherein the processor may modify said data, and a primary memory, the method including the steps of:

monitoring the primary memory to detect a data write to the primary memory;

copying the data write into a buffer memory simultaneously with the data write to the primary memory;

periodically flushing data from the first cache and the second cache and internal registers into the primary memory in synchronization;

after flushing, copying data from the buffer memory into a shadow storage element.

31. The method of claim 30, further including the steps of:

detecting when a fault has occurred;

when a fault has occurred, performing the steps of:
copying data from the shadow storage element into the primary memory element; and
resuming operation.

32. The method of claim 30, further including the steps of:

detecting when a fault has occurred;

when a fault has occurred, performing the steps of:
configuring the primary memory to shadow the checkpoint storage element; and
resuming operation using the shadow storage element as a primary memory.

33. The method of claim 30, wherein the step of flushing includes the steps of:

setting a lock and suspending normal operation;

flushing the first cache and the second cache;

waiting until the first processor and the second processor have completed flushing; and releasing the lock and resuming normal operations.

* * * * *